(12) United States Patent
Sims

(10) Patent No.: US 8,381,462 B1
(45) Date of Patent: Feb. 26, 2013

(54) MECHANISM FOR ADJUSTING THE LENGTH OF A SUPPORT COLUMN

(76) Inventor: William Sims, Lindenhurst, NY (US)

( * ) Notice: Subject to any disclaimer, the term of this patent is extended or adjusted under 35 U.S.C. 154(b) by 0 days.

(21) Appl. No.: 12/587,981

(22) Filed: Oct. 15, 2009

(51) Int. Cl.
*F16L 3/00* (2006.01)

(52) U.S. Cl. ........ 52/126.6; 52/301; 248/200.1; 248/59; 248/354.1

(58) Field of Classification Search .............. 52/126.6, 52/126.7, 301, 632, 831; 248/200.1, 354.1, 248/188.5; 405/290
See application file for complete search history.

(56) References Cited

U.S. PATENT DOCUMENTS

| | | | | |
|---|---|---|---|---|
| 1,381,663 A * | 6/1921 | Roeder | .................... | 248/354.5 |
| 2,510,688 A * | 6/1950 | Evans et al. | ................ | 248/354.2 |
| 2,812,834 A * | 11/1957 | Le Jeune | ................... | 52/126.7 |
| 2,816,769 A * | 12/1957 | Noble | ............................. | 279/83 |
| 2,858,694 A * | 11/1958 | Akins et al. | ................... | 52/126.7 |
| 2,955,504 A * | 10/1960 | Lovrinch et al. | ............... | 411/51 |
| 3,027,140 A * | 3/1962 | Holzbach | ....................... | 254/98 |
| 3,059,888 A * | 10/1962 | Lie | ............................... | 248/161 |
| 3,081,114 A * | 3/1963 | Esty | ............................... | 403/71 |
| 3,083,795 A * | 4/1963 | Land | ............................ | 52/126.7 |
| 3,280,527 A * | 10/1966 | Faust | ............................... | 52/301 |
| 3,288,418 A * | 11/1966 | Hinrichs et al. | ................ | 52/632 |
| 3,324,613 A * | 6/1967 | Duboff | ........................ | 52/126.7 |
| 3,429,092 A | 2/1969 | Perry et al. | | |
| 3,633,862 A * | 1/1972 | Breen | ........................... | 248/251 |
| 3,762,116 A * | 10/1973 | Anderson et al. | ............... | 52/239 |
| 3,877,191 A * | 4/1975 | Munsey | .......................... | 52/632 |
| 3,880,394 A * | 4/1975 | Wisecarver | ................ | 248/354.3 |
| 4,048,776 A | 9/1977 | Sato | | |
| 4,125,217 A | 11/1978 | Sato | | |
| 4,255,071 A * | 3/1981 | Koppers et al. | ............... | 405/290 |
| 4,373,310 A * | 2/1983 | Dean | ............................... | 52/182 |
| 4,498,204 A * | 2/1985 | Warner | ............................ | 4/559 |
| 4,946,325 A * | 8/1990 | Abraham | ........................ | 411/24 |
| 5,215,411 A * | 6/1993 | Seegmiller | ..................... | 405/290 |
| 5,400,994 A * | 3/1995 | Shawwaf et al. | .......... | 248/354.3 |
| 5,413,436 A * | 5/1995 | Merz | .............................. | 405/290 |
| 5,505,033 A | 4/1996 | Matsuo et al. | | |
| 5,678,382 A | 10/1997 | Naito | | |
| 5,819,482 A * | 10/1998 | Belke et al. | .................. | 52/126.6 |
| 5,826,847 A * | 10/1998 | Warner et al. | .............. | 248/354.1 |
| 5,901,525 A | 5/1999 | Doeringer et al. | | |
| 5,966,882 A | 10/1999 | Naito | | |
| 6,349,512 B1 * | 2/2002 | Berkey et al. | ................ | 52/126.6 |
| 2003/0006354 A1 * | 1/2003 | Biles et al. | ................ | 248/354.1 |
| 2003/0056447 A1 * | 3/2003 | O'Brien et al. | .............. | 52/127.2 |
| 2003/0167701 A1 * | 9/2003 | Rich | .............................. | 52/79.6 |
| 2005/0025602 A1 * | 2/2005 | Huang | ......................... | 411/57.1 |

* cited by examiner

*Primary Examiner* — William Gilbert
*Assistant Examiner* — Babajide Demuren
(74) *Attorney, Agent, or Firm* — Dilworth & Barrese, LLP.

(57) ABSTRACT

A mechanism for adjusting the length of a support column which comprises an elongated pipe. A cap plate is affixed onto a top end of the elongated pipe. The cap plate has a plurality of mounting holes. A base assembly is removably retained to a bottom end of the elongated pipe, utilizing an expandable chuck sleeve, after a lower portion of the elongated pipe is cut away, thereby to properly size the length of the elongated pipe.

17 Claims, 3 Drawing Sheets

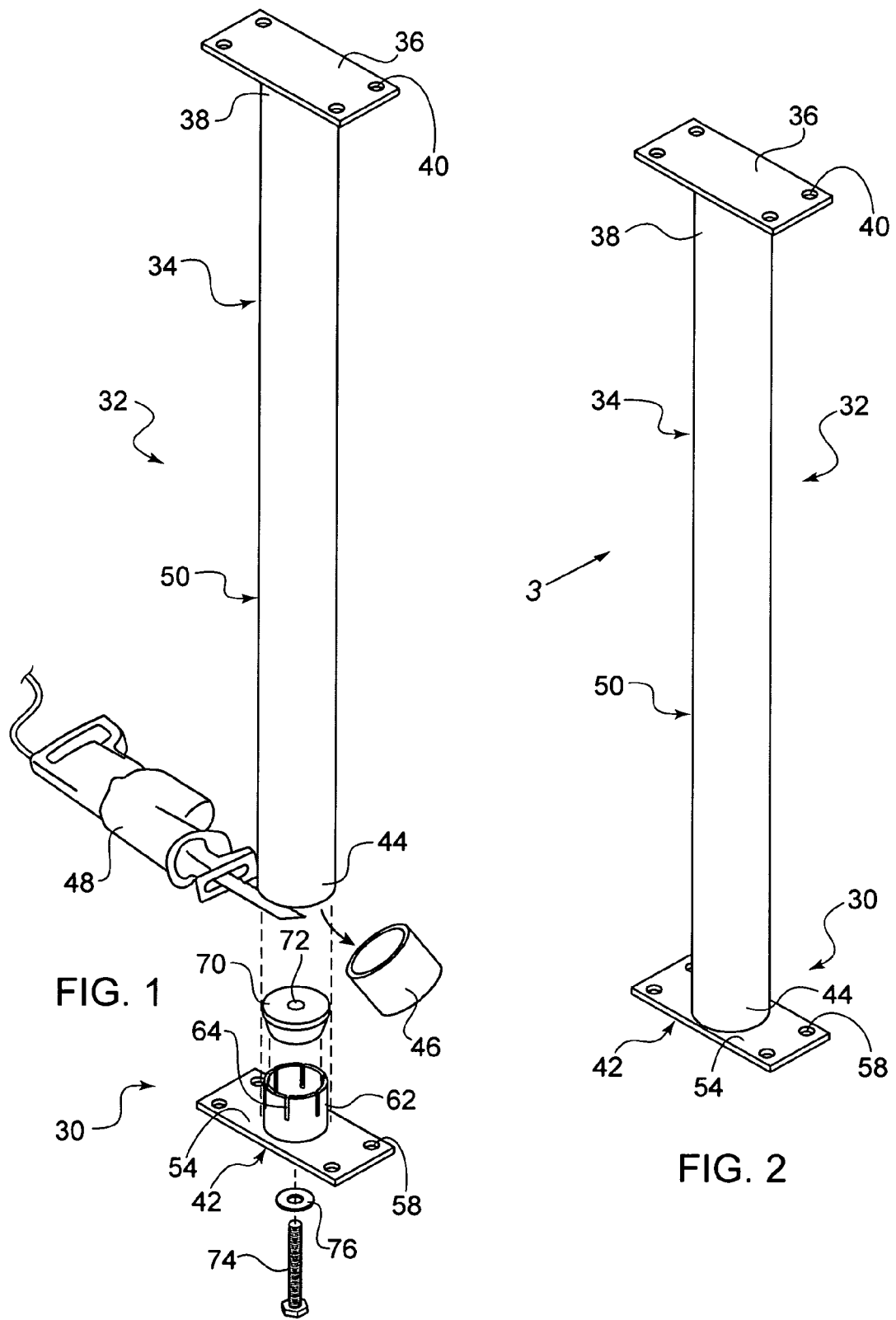

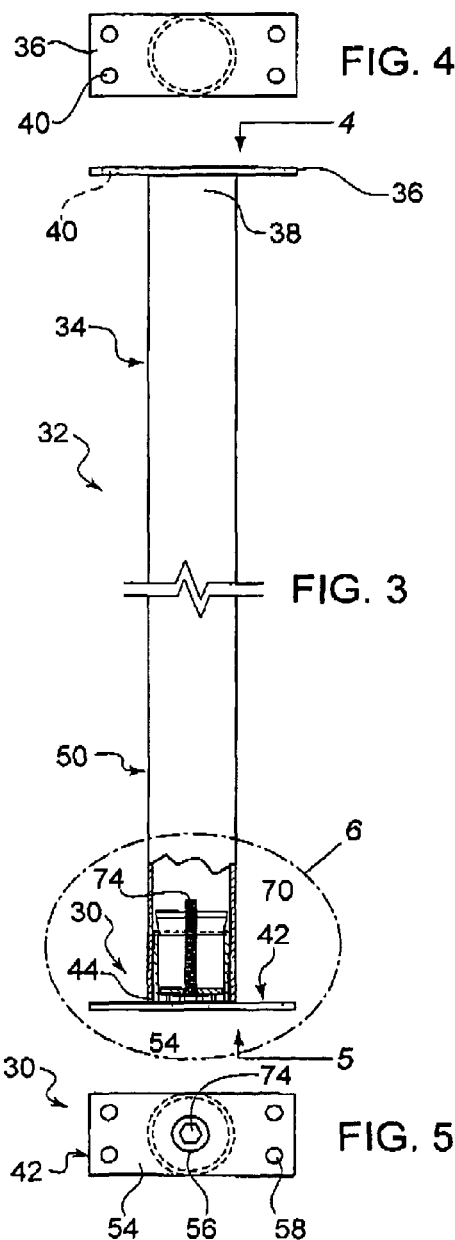

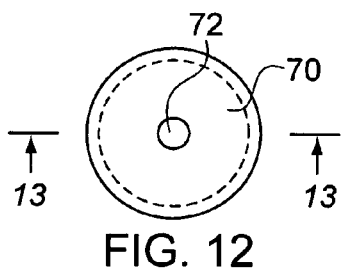
FIG. 12
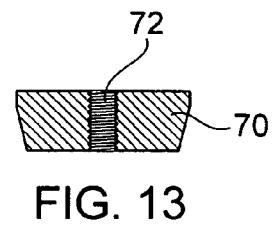
FIG. 13
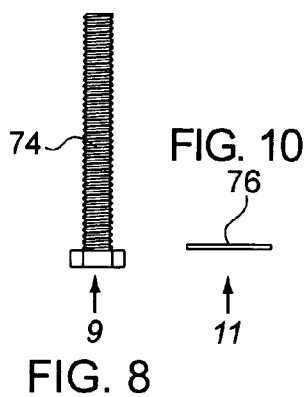
FIG. 8  FIG. 10
FIG. 9  FIG. 11
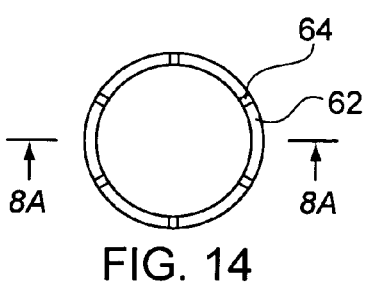
FIG. 14
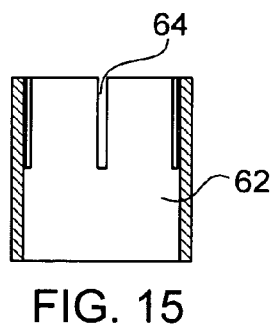
FIG. 15
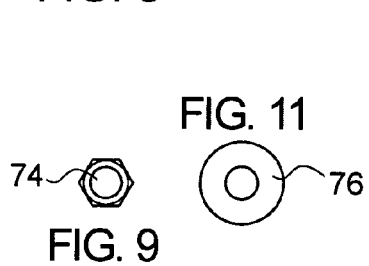
FIG. 16
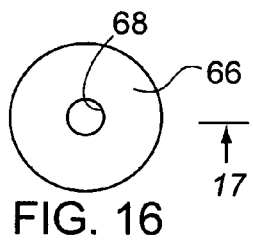
FIG. 17
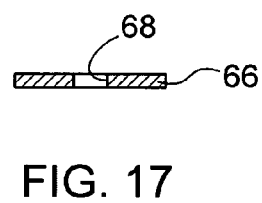
FIG. 18
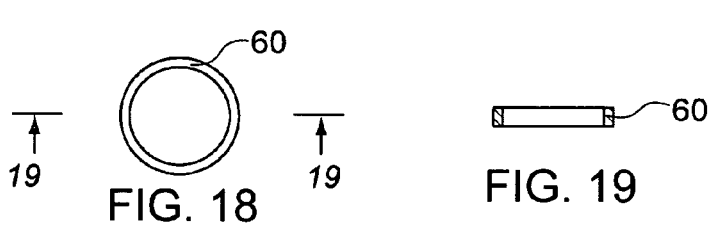
FIG. 19
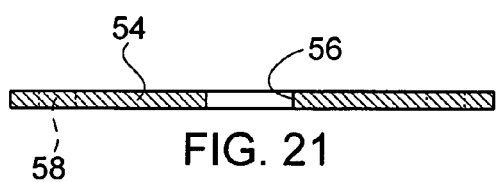
FIG. 21
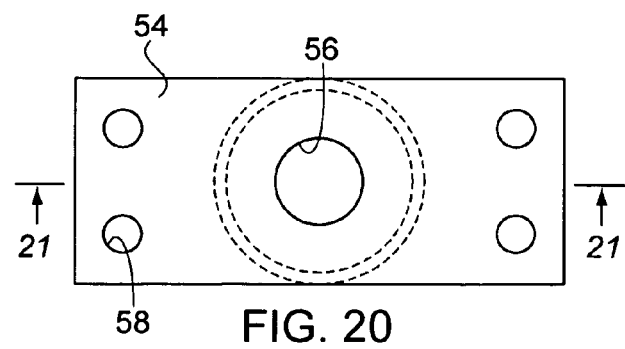
FIG. 20

MECHANISM FOR ADJUSTING THE LENGTH OF A SUPPORT COLUMN

BACKGROUND OF THE INVENTION

1. Field of the Invention

The present invention relates to a sport column, and more particularly, a mechanism for adjusting the length of a support column.

2. Description of the Prior Art

Numerous innovations for column structures with cooperating bases have been provided in the prior art that will be described. Even though these innovations may be suitable for the specific individual purposes to which they address, however, they differ from the present invention.

A FIRST EXAMPLE, U.S. Pat. No. 3,429,092, Issued on Feb. 25, 1969, to Perry et al. teaches a structural framing system utilizing preformed columns and beams and connections therefor which provide a rigid structural frame for both single and multistory structures. The columns which include axially extending bores are located, supported and connected to succeeding column tiers by connector spindles and radially extending collar means. The beam which comprise precast concrete include transversely extending bores which align with and receive the connector spindles extending from subjacent columns and can span a plurality of columns. A compressible gasket means can be interposed between the beam and the underlying column to define a bearing pad receiving space which is filled with a settable bearing pad forming material.

A SECOND EXAMPLE, U.S. Pat. No. 4,048,776, Issued on Sep. 20, 1977, to Sato teaches a steel column base member for connecting structural steel column member to a concrete foundation, which base member is an integral molded or die-forged body comprising a base plate portion to engage the foundation, a projected portion to be joined to the column, and smoothly curved sidewalls extending from the base plate portion to the projected portion. The top surface of the projected portion is of substantially identical shape with the cross section of the column.

A THIRD EXAMPLE, U.S. Pat. No. 4,125,217, Issued on Nov. 14, 1978, to Sato teaches a steel column base member for connecting a hollow or box-shaped structural steel column member having square, rectangular or annular section, to a concrete foundation, which base plate member is an integral cast or forged body comprising a bottom plate member to engage the foundation, a box-shaped projection upwardly extending from the bottom plate member and having J-shaped grooves formed along overall outer edges of top surface of projection the width of web of projection being broader than thickness of column member, so as to effect groove welding between the bottom surface of the steel column member and the J-shaped grooved surfaces. A method of connecting an hollow or box-shaped steel column member to a base plate member is characterized by, effective J-shaped groove welding along between J-shaped groove surfaces of base plate member and the bottom surfaces of steel column member.

A FOURTH EXAMPLE, U.S. Pat. No. 5,505,033, Issued on Apr. 9, 1996, to Matsuo et al. teaches a column base structure formed by integrally joining a column base metal fitting having a raised portion and a base plate to a steel-frame column, and joining the column base metal fitting joined to the steel-frame column to a concrete foundation via anchor bolts embedded in the concrete foundation, in which an anchor-bolt retainer having an upper anchor plate and a lower anchor plate is fixedly fitted to support members installed on a concrete subslab, anchor bolts are hold in position via the anchor-bolt retainer, and the anchor bolts are embedded, together with the anchor-bolt retainer, into the concrete foundation.

A FIFTH EXAMPLE, U.S. Pat. No. 5,678,382, Issued on Oct. 21, 1997, to Naito teaches a structure of base of column and a construction method for base of column formed by installing a lower end of column steel frame on a foundation formed under the ground. Plural column main reinforcing-bars, which have bottom bent portions and are incorporated in a foundation concrete at specified positions corresponding to a sectional shape of column, are protruded upward out of a top face of the foundation concrete and a lower end base plate of the column steel frame is combined to upper protruding portions of the column main reinforcing-bars. As combining measures, there are such measures that a tightening nuts are screwed onto male threaded portions provided on the protruding portions of the column main reinforcing-bars, or caulked portions are formed on the protruding portions of the column main reinforcing-bars. By these measures, a number of parts for combining the base of column and a construction cost can be reduced, a support strength of the column steel frame can be improved, and a number of construction work processes of the base of column can be reduced.

A SIXTH EXAMPLE, U.S. Pat. No. 5,901,525, Issued on May 11, 1999, to Doeringer et al. teaches an elevated column base for supporting a wood column subjected to high mechanical loads and protecting the column lowermost portion from rot and other deterioration due to exposure to a tropical environment. The column base includes a stanchion, a diaphragm, and a cap, each monolithically molded from a thermoplastic. A first embodiment of the stanchion adapted for a 6.times.6 or 8.times.8 column includes a solid base portion with a cavity which is filled with concrete and plugged with the diaphragm. The stanchion has two pairs of side walls attached to the base portion. Opposed gussets attached to the upper portions of one pair stiffen the side walls against transverse loads. Most of the load carried by the wood column is borne by the concrete and by two horizontal bolts. The diaphragm acts to spread the load force to the base portion and side walls. The load on the diaphragm acts to create a seal against moisture entering the cavity. A second embodiment of the stanchion adapted for a 4.times.4 column does not include gussets. The cap has four lateral faces fitting closely over the stanchion side walls, and a top face with a square aperture formed by four flexible web portions pressing against the wood column. After the column lowermost portion is secured within the stanchion by the bolts, the cap is slid downwardly until the ends of slots in the lateral faces contact the bolts. Each cap bottom corner edge and trough then bound an aperture through which water collected above the diaphragm can drain.

A SEVENTH EXAMPLE, U.S. Pat. No. 5,966,882, Issued on Oct. 19, 1999, to Naito teaches a structure of base of column and a construction method for base of column formed by installing a lower end of column steel frame on a foundation formed under the ground. Plural column main reinforcing-bars, which have bottom bent portions and are incorporated in a foundation concrete at specified positions corresponding to a sectional shape of column, are protruded upward out of a top face of the foundation concrete and a lower end base plate of the column steel frame is combined to upper protruding portions of the column main reinforcing-bars. As combining measures, there are such measures that a tightening nuts are screwed onto male threaded portions provided on the protruding portions of the column main reinforcing-bars, or caulked portions are formed on the protruding portions of the column main reinforcing-bars. By these measures, a number of parts for combining the base of column and a construction cost can be reduced, a support strength of the column steel frame can be improved, and a number of construction work processes of the base of column can be reduced.

It is apparent now that numerous innovations for column structures with cooperating bases have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a mechanism for adjusting the length of a support column that avoids the disadvantages of the prior art.

ANOTHER OBJECT of the present invention is to provide a mechanism for adjusting the length of a support column that is simple and inexpensive to manufacture.

STILL ANOTHER OBJECT of the present invention is to provide a mechanism for adjusting the length of a support column that is simple to use.

BRIEFLY STATED, STILL YET ANOTHER OBJECT of the present invention is to provide a mechanism for adjusting the length of a support column which comprises an elongated pipe. A cap plate is affixed onto a top end of the elongated pipe. The cap plate has a plurality of mounting holes. A base assembly is retained to a bottom end of the elongated pipe after a lower portion of the elongated pipe is cut away, thereby to properly size the length of the elongated pipe.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic exploded perspective view of an embodiment of the present invention being cut to size;

FIG. 2 is a diagrammatic perspective view of the present invention ready for installation at a construction site;

FIG. 3 is a diagrammatic elevational view taken in the direction of arrow 3 in FIG. 2, with parts broken away and in cross section, before the base assembly is retained in place;

FIG. 4 is a diagrammatic top view taken in the direction of arrow 4 in FIG. 3;

FIG. 5 is a diagrammatic bottom view taken in the direction of arrow 5 in FIG. 3;

FIG. 6 is an enlarged diagrammatic view of the area enclosed in the dotted curve indicated by arrow 6 in FIG. 3;

FIG. 7 is an enlarged diagrammatic view similar to FIG. 6, but showing the base assembly retained in place;

FIG. 8 is a diagrammatic elevational view of the machine bolt;

FIG. 9 is a diagrammatic bottom view taken in the direction of arrow 9 in FIG. 8;

FIG. 10 is a diagrammatic elevational view of the washer;

FIG. 11 is a diagrammatic bottom view taken in the direction of arrow 11 in FIG. 10;

FIG. 12 is a diagrammatic top view of the frusto-conical plug;

FIG. 13 is a diagrammatic cross sectional view taken on line 13-13 in FIG. 12;

FIG. 14 is a diagrammatic top view of the expandable chuck sleeve;

FIG. 15 is a diagrammatic cross sectional view taken along line 15-15 in FIG. 14;

FIG. 16 is a diagrammatic top view of the disc member;

FIG. 17 is a diagrammatic cross sectional view taken along line 17-17 in FIG. 16;

FIG. 18 is a diagrammatic top view of the spacer ring;

FIG. 19 is a diagrammatic cross sectional view taken along line 19-19 in FIG. 18;

FIG. 20 is a diagrammatic bottom view of the base plate; and

FIG. 21 is a diagrammatic cross sectional view taken along line 21-21 in FIG. 20.

| A MARSHALING OF REFERENCE NUMERALS UTILIZED IN THE DRAWING | |
|---|---|
| 30 | mechanism |
| 32 | support column of mechanism 30 |
| 34 | elongated pipe of support column 32 |
| 36 | cap plate of support column 32 |
| 38 | top end of elongated pipe 34 |
| 40 | mounting hole is cap plate 36 |
| 42 | base assembly of mechanism 30 |
| 44 | bottom end of elongated pipe 34 |
| 46 | lower portion of elongated pipe 34 |
| 48 | reciprocating saw |
| 50 | cylindrical hollow steel component for elongated pipe 34 |
| 52 | durable material (concrete) |
| 54 | base plate of base assembly 42 |
| 56 | central aperture in base plate 54 |
| 58 | mounting hole in base plate 54 |
| 60 | spacer ring of base assembly 42 |
| 62 | expandable chuck sleeve of base assembly 42 |
| 64 | upper vertical slot in expandable chuck sleeve 62 |
| 66 | disc member of base assembly 42 |
| 68 | central aperture in disc member 66 |
| 70 | frusto-conical plug of base assembly 42 |
| 72 | central threaded hole in frusto-conical plug 70 |
| 74 | machine bolt of base assembly 42 |
| 76 | washer of base assembly 42 |

DETAILED DESCRIPTION OF THE PREFERRED EMBODIMENT

Referring now to the figures, in which like numerals indicate like parts, and particularly to FIGS. 1 through 21, which are a diagrammatic exploded perspective view of an embodiment of the present invention being cut to size; a diagrammatic perspective view of the present invention ready for installation at a construction site; a diagrammatic elevational view taken in the direction of arrow 3 in FIG. 2, with parts broken away and in cross section, before the base assembly is retained in place; a diagrammatic top view taken in the direction of arrow 4 in FIG. 3; a diagrammatic bottom view taken in the direction of arrow 5 in FIG. 3; an enlarged diagrammatic view of the area enclosed in the dotted curve indicated by arrow 6 in FIG. 3; an enlarged diagrammatic view similar to FIG. 6, but showing the base assembly retained in place; a diagrammatic elevational view of the machine bolt; a diagrammatic bottom view taken in the direction of arrow 9 in FIG. 8; a diagrammatic elevational view of the washer; a diagrammatic bottom view taken in the direction of arrow 11 in FIG. 10; a diagrammatic top view of the frusto-conical plug; a diagrammatic cross sectional view taken on line 13-13 in FIG. 12; a diagrammatic top view of the expandable chuck sleeve; a diagrammatic cross sectional view taken along line 15-15 in FIG. 14; a diagrammatic top view of the disc member; a diagrammatic cross sectional view taken along line 17-17 in FIG. 16; a diagrammatic top view of the spacer ring; a diagrammatic cross sectional view taken along line 19-19 in FIG. 18; a diagrammatic bottom view of the base plate; and a diagrammatic cross sectional view taken along line 21-21 in FIG. 20, and as such, will be discussed with reference thereto.

The present invention is a mechanism 30 for adjusting the length of a support column 32 which comprises an elongated pipe 34. A cap plate 36 affixed by welding onto a top end 38 of the elongated pipe 34. The cap plate 36 has a plurality of mounting holes 40. A base assembly 42 is retained to a bottom end 44 of the elongated pipe 34 after a lower portion 46 of the elongated pipe 34 is cut away, such as by a reciprocating saw 48, thereby to properly size the length of the elongated pipe 34.

The elongated pipe 34 is comprised out of a cylindrical hollow steel component 50. A durable material 52, such as concrete, can be filled within the elongated pipe 34 before the base assembly 42 is retained in place, thereby adding additional strength to the support column 32.

The base assembly 42 comprises a base plate 54 having a central aperture 56 and a plurality of mounting holes 58. A spacer ring 60 is attached by welding to the base plate 54 and is concentrically positioned over the central aperture 56. An expandable chuck sleeve 62 has a plurality of upper vertical slots 64 thereabout, and is attached by welding to the base plate 54 over the spacer ring 60. A disc member 66 has a central aperture 68, wherein the disc member 66 is recessed within a bottom of and attached by welding to the expandable chuck sleeve 62.

A frusto-conical plug 70 has a central threaded hole 72 therethrough, wherein the frusto-conical plug 70 sits upon a top end of the expandable chuck sleeve 62. A machine bolt 74 is provided. A washer 76 fits over the machine bolt 74. The machine bolt 74 extends through the central aperture 56 in the base plate 54, passes the spacer ring 60, goes through the central aperture 68 in the disc member 66 and is threaded into the central threaded hole 72 in the frusto-conical plug 70. When the machine bolt 74 is tightened the frusto-conical plug 70 will be pulled down to cause the expandable chuck sleeve 62 to open and bear against an inner wall 78 of the elongated pipe 34.

To adjust the length of the support column 32 the following steps should be taken:
1. Provide the elongated pipe 34.
2. Affix the cap plate 36 by welding onto the top end 38 of the elongated pipe 34.
3. Cut away the lower portion 46 of the elongated pipe 34 to properly size the length of the elongated pipe 34.
4. Fill the durable material 52, such as concrete, into the elongated pipe 34, thereby adding additional strength to the support column 32.
5. Removable retain the base assembly 42 to the bottom end 44 of the elongated pipe 34, by tightening the machine bolt 74 of base assembly 42, thereby causing expandable chuck sleeve 62 to securely grip bottom end 44 of the inner wall 78 of elongated pipe 34.

It will be understood that each of the elements described above, or two or more together, may also find a useful application in other types of constructions differing from the types described above.

While the invention has been illustrated and described as embodiments of a mechanism for adjusting the length of a support column, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A mechanism for adjusting the length of a support column, comprising:
   a) an elongated pipe;
   b) a cap plate affixed onto a top end of said elongated pipe, said cap plate having a plurality of mounting holes; and
   c) a base assembly retained to a bottom end of said elongated pipe after a lower portion of said elongated pipe is cut away, thereby to properly size the length of said elongated pipe;
   wherein said base assembly comprises:
   a) a base plate having a central aperture and a plurality of mounting holes;
   b) a spacer ring attached to the base plate and being concentrically positioned over said central aperture;
   c) an expandable chuck sleeve having a plurality of upper vertical slots thereabout and attached to said base plate over said spacer ring;
   d) a disc member having a central aperture, wherein said disc member is recessed within a bottom of and attached to said expandable chuck sleeve;
   e) a frusto-conical plug having a central threaded hole therethrough, wherein said frusto-conical plug sits upon a top end of said expandable chuck sleeve; and
   f) a machine bolt;
   wherein said spacer ring and said disc member are positioned within said expandable chuck sleeve, and
   wherein said machine bolt extends through said central aperture in said base plate, passes said spacer ring, goes through said central aperture in said disc member and is threaded into said central threaded hole in said frusto-conical plug, so that when said machine bolt is tightened said frusto-conical plug will be pulled down to cause said expandable chuck sleeve to open and bear against an inner wall of said elongated pipe.

2. The mechanism as recited in claim 1, wherein said elongated pipe is comprised out of a cylindrical hollow steel component.

3. The mechanism as recited in claim 1, further comprising a durable material filled within said elongated pipe before said base assembly is retained in place, thereby adding additional strength to said support column.

4. A support column, comprising:
   A) an elongated pipe;
   B) a cap plate affixed onto a top end of said elongated pipe, said cap plate having a plurality of mounting holes; and
   C) a base assembly retained to a bottom end of said elongated pipe, wherein said base assembly comprises:
   a) a base plate having a central aperture and a plurality of mounting holes;
   b) a spacer ring attached to the base plate and being concentrically positioned over said central aperture;

c) an expandable chuck sleeve having a plurality of upper vertical slots thereabout, and attached to said base plate over said spacer ring;

d) a disc member having a central aperture, wherein said disc member is recessed within a bottom of and attached to said expandable chuck sleeve;

e) a frusto-conical plug having a central threaded hole therethrough, wherein said frusto-conical plug sits upon a top end of said expandable chuck sleeve; and f) a machine bolt;

wherein said spacer ring and said disc member are positioned within said expandable chuck sleeve, and wherein said machine bolt extends through said central aperture in said base plate, passes said spacer ring, goes through said central aperture in said disc member and is threaded into said central threaded hole in said frusto-conical plug, so that when said machine bolt is tightened said frusto-conical plug will be pulled down to cause said expandable chuck sleeve to open and bear against an inner wall of said elongated pipe.

5. The mechanism as recited in claim 4, wherein said elongated pipe is comprised out of a cylindrical hollow steel component.

6. The mechanism as recited in claim 4, further comprising a durable material filled within said elongated pipe before said base assembly is retained in place, thereby adding additional strength to said support column.

7. A method of adjusting the length of a support column comprising the steps of:

a) providing an elongated pipe;

b) affixing a cap plate onto a top end of the elongated pipe;

c) cutting away a lower portion of the elongated pipe to properly size the length of the elongated pipe; and d) removably retaining a base assembly to a bottom end of the elongated pipe;

wherein said base assembly comprises:

i) a base plate having a central aperture and a plurality of mounting holes;

ii) a spacer ring attached to the base plate and being concentrically positioned over said central aperture;

iii) an expandable chuck sleeve having a plurality of upper vertical slots thereabout, and attached to said base plate over said spacer ring;

iv) a disc member having a central aperture, wherein said disc member is recessed within a bottom of and attached to said expandable chuck sleeve;

v) a frusto-conical plug having a central threaded hole therethrough, wherein said frusto-conical plug sits upon a too end of said expandable chuck sleeve; and vi) a machine bolt;

wherein said spacer ring and said disc member are positioned within said expandable chuck sleeve, and wherein said machine bolt extends through said central aperture in said base plate, passes said spacer ring, goes through said central aperture in said disc member and is threaded into said central threaded hole in said frusto-conical plug, so that when said machine bolt is tightened said frusto-conical plug will be pulled down to cause said expandable chuck sleeve to open and bear against an inner wall of said elongated pipe.

8. The method as recited in claim 7, further comprising between steps c) and d) the additional step of filling a durable material into the elongated pipe, thereby adding additional strength to the support column.

9. The mechanism as recited in claim 1, wherein the cap plate is welded to the top end of said elongated pipe.

10. The mechanism as recited in claim 4, wherein the cap plate is welded to the top end of said elongated pipe.

11. The method as recited in claim 7, wherein the cap plate is welded to the top end of said elongated pipe.

12. The mechanism as recited in claim 1, wherein said bottom end of said elongated pipe abuts with an upper surface of said base plate, and wherein said spacer ring, said expandable chuck sleeve, said disc member, said frusto-conical plug, and said machine bolt are configured to not extend beyond said bottom end of said elongated pipe.

13. The mechanism as recited in claim 1, wherein said expandable chuck sleeve, said disc member, said spacer ring, and said base plate are welded together to form a one-piece structure.

14. The mechanism as recited in claim 4, wherein said bottom end of said elongated pipe abuts with an upper surface of said base plate, and wherein said spacer ring, said expandable chuck sleeve, said disc member, said frusto-conical plug, and said machine bolt are configured to not extend beyond said bottom end of said elongated pipe.

15. The mechanism as recited in claim 4, wherein said expandable chuck sleeve, said disc member, said spacer ring, and said base plate are welded together to form a one-piece structure.

16. The method as recited in claim 7, wherein said bottom end of said elongated pipe abuts with an upper surface of said base plate, and wherein said spacer ring, said expandable chuck sleeve, said disc member, said frusto-conical plug, and said machine bolt are configured to not extend beyond said bottom end of said elongated pipe.

17. The method as recited in claim 7, wherein said expandable chuck sleeve, said disc member, said spacer ring, and said base plate are welded together to form a one-piece structure.

* * * * *